April 2, 1968

F. L. BEECHLER ETAL 3,376,024

DISSOLVER BLADE

Filed Nov. 1, 1966

INVENTORS.
Frank L. Beechler,
William M. A. Kuypers,
by
Attorney

United States Patent Office 3,376,024
Patented Apr. 2, 1968

3,376,024
DISSOLVER BLADE
Frank L. Beechler, 953 Rex Road, Pico Rivera,
Calif. 90660, and William M. A. Kuypers,
569 E. Mar Vista, Whittier, Calif. 90602
Filed Nov. 1, 1966, Ser. No. 591,236
2 Claims. (Cl. 259—134)

ABSTRACT OF THE DISCLOSURE

Paint blending apparatus having a disc with a plurality of removable teeth attached thereto adjacent the periphery thereof, each tooth having a body and an outwardly turned flange adjacent each end, the flanges being in planes of chords of said disc.

---

This invention relates generally to impeller blades and relates more particularly to dissolver blades for blending paint or the like.

While the invention has particular utility embodied in a dissolver blade for the mixing and blending of paint and the like, and is shown and described thus embodied, it is to be understood that its utility is not confined thereto.

The problem of providing suitable blades for blending and mixing paint involves certain well known difficulties. For example, the blades wear rapidly, particularly with paints to which clay and/or other abrasive materials are added. Present types of blades with which we are familiar have teeth integral with the disc and hence the entire blade must be thrown away when the teeth wear down. This entails frequent replacement of the blades and hence involves considerable expense.

Further these blades must be operated at relatively high speeds and the higher speeds the faster the wear.

The present invention solves the problem and overcomes the difficulties involved by providing a dissolver blade having a disc to which the teeth are attached so that the teeth are removable and hence replaceable. Thus when the teeth wear out they may be removed from the disc and replaced with new teeth so that only the worn out teeth are thrown away as the disc will last for a relatively long time.

It is therefore an object of the present invention to provide a dissolver blade that will provide much longer effective use and service than previous blades.

It is another object of the invention to provide a device of this character having replaceable teeth.

Still another object of the invention is to provide a device of this character that has teeth with maximum working surfaces.

A further object of the invention is to provide a device of this character having teeth that are more efficient and effective than heretofore so that paint may be properly ground, mixed, liquified and/or blended in a relatively short time.

A still further object of the invention is to provide a dissolver blade of this character that operates effectively at relatively lower speeds.

Another object of the invention is to provide a dissolver blade of this character that requires less horsepower to operate effectively.

Still another object of the invention is to provide a dissolver blade of this character wherein the teeth of the same size may be effectively and efficiently used on discs of various sizes or diameters.

A further object of the invention is to provide a dissolver blade wherein the teeth are disposed on both sides of the disc which therefore provides faster mixing and blending.

A still further object of the invention is to provide a dissolver blade of this character wherein should a single tooth be damaged it may be replaced without replacing other teeth or discarding the entire blade. This is an important feature in servicing the equipment and keeping cost down.

The characteristics and advantages of the invention are further sufficiently referred to in connection with the following detailed description of the accompanying drawings which represent one embodiment. After considering this example, skilled persons will understand that many variations may be made without departing from the principles disclosed and we contemplate the employment of any structures, arrangements or modes of operation that are properly within the scope of the appended claims.

Referring to the drawings, which are for illustrative purposes only:

Figures 1, 2, 3, 4:
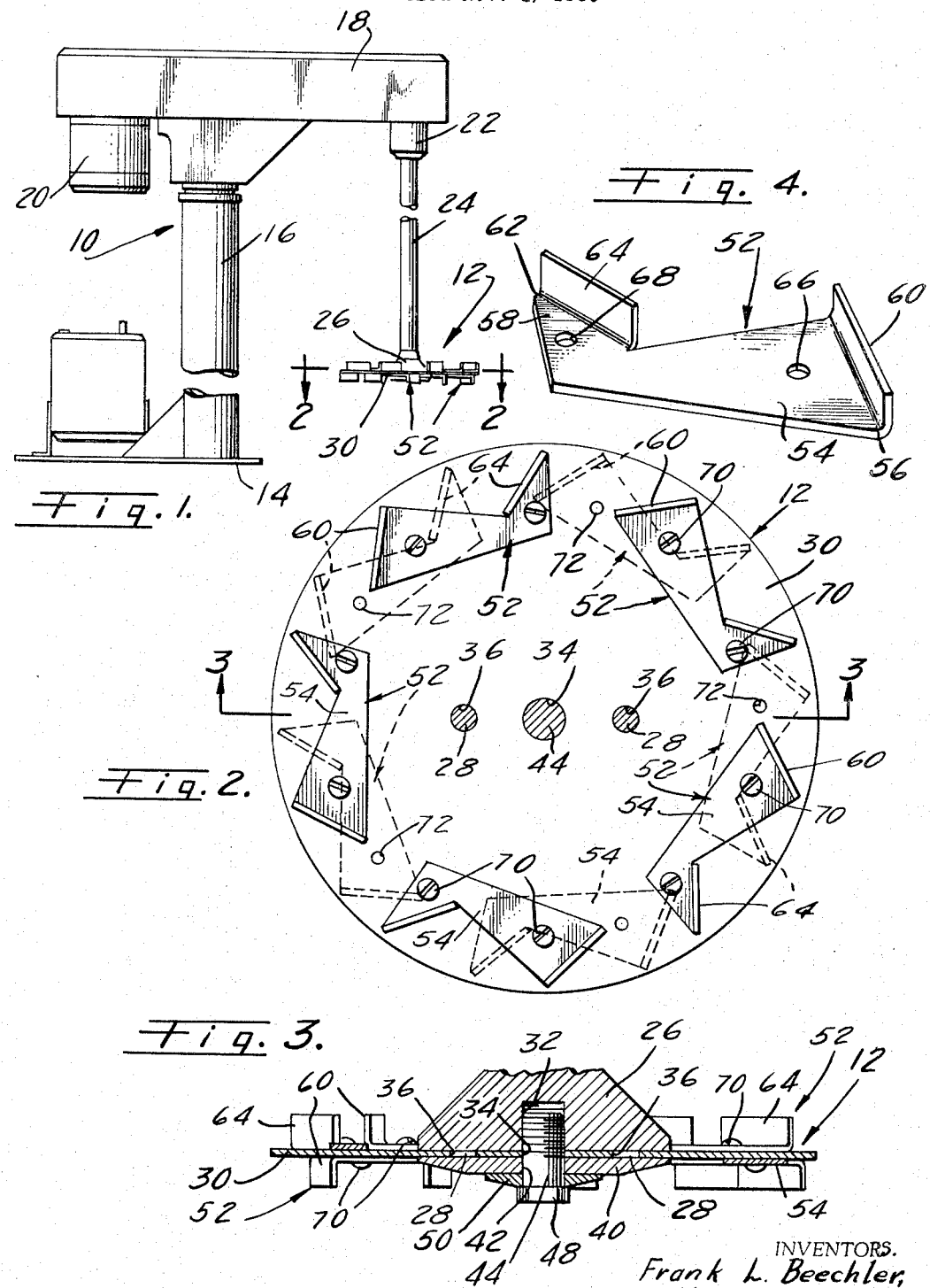
FIG. 1 is a side view of a paint mixing machine having a dissolver blade embodying the present invention.
FIG. 2 is an enlarged view of the blade taken on line 2—2 of FIG. 1.
FIG. 3 is a sectional view taken on line 3—3 of FIG. 2.
FIG. 4 is an enlarged perspective view of one of the teeth of the present invention.

Referring more particularly to the drawings there is shown apparatus having a dissolver blade embodying the present invention, said apparatus being indicated generally at 10 and the blade being indicated generally at 12.

Briefly the apparatus includes a base 14 having a standard or post 16 extending upwardly therefrom and having a housing 18 at the upper end. Housing 18 is substantially horizontal and is mounted intermediate its ends on said standard 16. At one end of the housing is and electric motor 20 and adjacent the opposite end is a bearing 22 in which the upper end of a shaft 24 is operably mounted. Within the housing 18 there is means, not shown, connecting the motor 20 with the drive shaft 24, said means connecting said motor and drive shaft being of well known character and need not be further described.

At the lower end of shaft 24 there is an enlarged clamping member 26 which is integral with shaft 24. The lower face of the clamping member 26 is flat and substantially horizontal and there are a pair of pins 28 extending downwardly from said member 26, said pins being at opposite sides of the axis of said shaft. There is also a tapped bore 32 extending axially upwardly in the clamping member 26.

The plate 30 of the dissolver blade is provided with an axial opening 34 and a pair of openings 36 therethrough at opposite sides of the axial opening 34 and spaced therefrom and so positioned as to receive the pins 28 of the clamping member 26 when the dissolver blade is attached to the shaft 24, as best shown in FIGS. 1 and 3.

When the dissolver blade is attached to the shaft there is a second clamping member indicated at 40 which is circular and which has an axial opening 42 therein for reception of a screw 44 that is received in the opening 42 of the clamping member 40, the opening 34 in the disc 30 and in the tapped bore 32 of the clamping member 26. Bolt 44 has a head 48 for engagement by suitable tool for tightening or removing same and there is a washer 50 between the head 48 and the screw 44 and the outer side of the clamping member 40.

The teeth, indicated generally at 52, are attached to both sides of the disc 30 and each of said teeth comprises a body having a mean portion 54 that is relatively wide at what will be termed its outer end 56 and tapers to its opposite end. At said opposite end there is a laterally extending portion 58 that is tapered towards its free end. At the free end or outer end portion 56 the tooth has an upturned flange 60 that extends transversely of said mean body portion 54. Along the edge portion 62 of the lateral portion 58 of the tooth there is a flange 64 that is upturned in the same direction as the flange 60, said edge 62 being that edge of the laterally extending portion 58 that is nearest to the flange 60. Flanges 60 and 64 are at an oblique angle relative to each other.

The body of the tooth is provided with a pair of holes therein, one hole 66 being adjacent the flange 60 and the other hole, indicated at 68, being adjacent the flange 64 and in the laterally extending portion 58 of the body of the tooth. Holes 66 and 64 are for the reception of screws 70 which are screwed into tapped openings 72 provided therefor in the disc 30, said tapped opening in the disc being arranged for alignment with the openings or holes 66 and 68 of the respective teeth.

When the teeth are mounted on the disc the teeth of one side are staggered relative to the teeth on the opposite side, this staggered arrangement being best shown in FIG. 2. When the teeth are mounted on the disc 30 the flange 60 of each tooth is so positioned that its inner end is closer to the axis of the disc than its outer end. The inner end of the flange 64 of each tooth is positioned further from the axis of the disc than the inner end of the flange 60, the outer ends of both flanges 60 and 64 are substantially the same distance from the axis of the disc. Otherwise stated, the flanges are in planes of chords of the disc, and in planes at an obtuse angle relative to each other.

The screws 70 are used to attach the teeth to the disc 30 and the teeth may be removed by unscrewing said screws 70. When the teeth become worn so that they require replacement the screws 70 are removed or unscrewed and new teeth are attached by means of said screws. Should a single tooth be damaged it may be individually removed and replaced without the necessity of changing all of the teeth or throwing the disc away as is necessary with previous blades.

While the dissolver blade may be removed from the shaft 24 it is to be noted that it is unnecessary to remove the entire device to replace one or more of the teeth.

The present invention, above described, grinds and liquefy paint, varnishes or the like, and thoroughly mixes and blends the paint. Further, it has been found that it requires less power to operate this blade than previous blades of which we are aware and the blade does not need to be operated at as great a speed or r.p.m. as previous blades since the teeth work faster and have a much greater working surfaces than the teeth of such previous blades.

Further, by having the teeth on both sides of the disc a much more effective action is provided.

As above pointed out, teeth of the same size may be used on discs of various sizes. Thus manufacturing costs can be kept at a minimum and only one size of the teeth need be stocked.

The invention and its attendent advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and we do not wish to be restricted to the specified form shown or uses mentioned except as defined in the accompanying claims.

We claim:

1. In an impeller blade for a rotatable shaft of a dissolver machine:
    (A) a disc;
    (B) a plurality of teeth, each tooth comprising
        (a) a body having a main part with a base at one end, said main part tapering toward the opposite end and a laterally extending tapered portion adjacent said opposite end;
        (b) a flange along said base, said flange being turned outwardly relative to said body;
        (c) a flange along an edge of the laterally turned portion of said body, said flange being turned outwardly in the same direction as the flange along said base;
    (C) and means for attaching the teeth to said disc adjacent the periphery thereof with the flanges thereof in planes of chords of said disc.

2. A tooth for a dissolver blade;
    (A) an elongated flat body adapted to be attached to a dissolver blade, said body having a main part with a base at one end, said main part tapering toward the opposite end;
    (B) a flange along said base, said flange being normal to said body;
    (C) said body having a laterally extending tapered portion adjacent the end opposite the base;
    (D) a flange along an edge of the laterally extending body tapered portion, said flange also being normal to said body and extending in the same direction from the body as the flange along the base thereof, said flanges being in planes forming an acute angle.

References Cited

UNITED STATES PATENTS

| | | | |
|---|---|---|---|
| 2,384,952 | 9/1945 | Miller | 259—134 |
| 3,290,016 | 12/1966 | Lennon et al. | 259—108 |
| 3,322,401 | 5/1967 | Mersch | 259—135 X |

WILLIAM I. PRICE, *Primary Examiner.*